United States Patent [19]

Fan

[11] 4,415,698

[45] * Nov. 15, 1983

[54] METHOD OF PREPARING WATER-BORNE COLLOIDAL DISPERSIONS OF VINYL RESINS

[75] Inventor: You-Ling Fan, East Brunswick, N.J.

[73] Assignee: Union Carbide Corporation, Danbury, Conn.

[*] Notice: The portion of the term of this patent subsequent to Jan. 8, 1997 has been disclaimed.

[21] Appl. No.: 333,892

[22] Filed: Dec. 23, 1981

Related U.S. Application Data

[63] Continuation-in-part of Ser. No. 104,070, Dec. 17, 1979, abandoned.

[51] Int. Cl.$^3$ .............................................. C08F 27/06
[52] U.S. Cl. .................................. 524/521; 427/236; 523/100; 524/522; 524/166; 524/365; 524/379; 524/389; 524/390; 524/428; 524/556; 524/563; 524/567; 524/568
[58] Field of Search ............... 524/556, 563, 567, 568, 524/464, 365, 379, 521, 389, 522, 390, 428

[56] References Cited

U.S. PATENT DOCUMENTS

| | | | |
|---|---|---|---|
| 3,907,737 | 9/1975 | Marx et al. | 260/29.6 NP |
| 3,925,287 | 12/1975 | Anderson | 260/29.6 TA |
| 4,057,527 | 11/1977 | Columbus | 260/29.6 |
| 4,064,087 | 12/1977 | Das | 260/29.6 RB |
| 4,065,415 | 12/1977 | Christenson et al. | 260/17.4 SG |
| 4,070,319 | 1/1978 | Carel et al. | 260/29.4 UA |
| 4,127,422 | 11/1978 | Guzi, Jr. et al. | 106/308 Q |
| 4,182,699 | 1/1980 | Fan | 260/29.6 PM |
| 4,202,808 | 5/1980 | Fan | 260/29.6 WB |
| 4,209,562 | 6/1980 | Suwala | 524/522 |
| 4,340,524 | 7/1982 | Bullman | 524/522 |

Primary Examiner—C. A. Henderson
Attorney, Agent, or Firm—Bernard Francis Crowe

[57] ABSTRACT

Vinyl and vinylidene halide resins containing carboxyl or sulfonic acid functionalities can be formulated as stable, aqueous, colloidal dispersions by converting them to ionomers in a mixture of water-miscible base, water, organic water-miscible macromolecular compound, water-miscible organic solvent having an affinity for the resin and water-miscible organic co-solvent which is a poor solvent for the resins and a water-immiscible organic diluent, stripping the resultant colloidal dispersion to a total organic solvent content of about 0.2 to about 20% by volume and finally mixing the colloidal dispersion with an acrylic internally cross-linked rheology modifier.

3 Claims, No Drawings

METHOD OF PREPARING WATER-BORNE COLLOIDAL DISPERSIONS OF VINYL RESINS

This is a continuation-in-part of U.S. patent application Ser. No. 104,070, filed Dec. 17, 1979 now abandoned.

BACKGROUND OF THE INVENTION

This invention pertains to the preparation of stable, aqueous colloidal dispersions of carboxylic acid or sulfonic acid-containing vinyl resins and more particularly to their preparation of vinyl resin colloidal dispersions by mixing said resins with water, base, an organic solvent, an organic co-solvent and a macromolecular compound.

Solution polymerized vinyl halide resins have been widely used as an interior coating resin for the beer and beverage cans. They are FDA approved vehicles, provide good protection for the metallic substrates from corrosive effects of the contents, and excellent blush resistance during pasteurization while contributing no undesirable taste properties. For these reasons, they are preferred over most of the other coating resins for this demanding application.

Because these vinyl halide resins are normally applied as a lacquer, a large amount of organic solvents is evolved during the application. Being ecologically undesirable and expensive, this technology has been replaced rapidly by other technologies where the solvent requirement can be reduced to a much lower level. The most prominent one is the waterborne coatings technology.

A waterborne coating may be formed from a water-soluble resin, a latex, or an emulsion. A water-soluble resin formulation is often too water sensitive to pass the required blush resistance test. On the other hand, latices and emulsions produced by the conventional methods almost always contain one or a combination of surfactants to effect the dispersion as well as fragments from the initiator system used. These additives often become a source of either poor blush resistance or possibly bad taste properties, or both.

It is therefore an object of this invention to prepare water-borne colloidal dispersions of vinyl resins suited for various coating applications.

SUMMARY OF THE INVENTION

A method of preparing water colloidal dispersions of vinyl resins suitable for various coating applications has been found which comprises:

A. blending said resins with:
  (a) water;
  (b) water-miscible base;
  (c) at least one water-miscible organic solvent which is a good solvent for said resins and boils below about 160° C.;
  (d) an organic and water-miscible cosolvent which is poor solvent for said resins but is miscible with the organic solvent (d); and
  (e) about 1 to about 49 parts by weight of a water-immiscible organic diluent per hundred parts by weight of organic solvent (c) until a colloidal dispersion forms;

B. stipping off the colloidal dispersion until the total content of organic solvents (c) and (d) and diluent (f) of the colloidal dispersion is about 0.2 to about 20% by volume; and then C. mixing an effective amount of an acrylic internally crosslinked rheology modifier with the colloidal dispersion from B until a stable colloidal dispersion is obtained.

It is preferred to prepare these colloidal dispersions by:

(A) blending a normally solid vinyl resin containing carboxylic or sulfonic acid groups and having the following moieties copolymerized herein

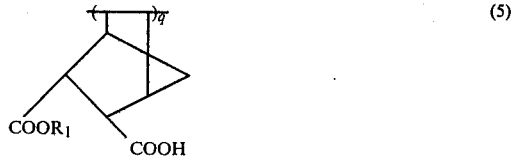

wherein m and n are percentages each having a value of 0-99%, t is a percentage having a value of 0-59%;

p is a percentage having a value of 1-30%; when $q=0$ q is a percentage having a value of 1-30%; when $p=0$ with the proviso that $m+n+t$ is $\geq 70$ and $\leq 90\%$, that $m+n+t+p+q=100\%$, that when $m=0$, n is at least 1 and that when $n=0$, m is at least 1; wherein X is a monovalent radical selected from the group consisting of —H and lower alkyls having 1-4 carbons;

W is a monovalent radical selected from the group consisting of —H, lower alkyls, aryl having 6 to about 9 carbons,

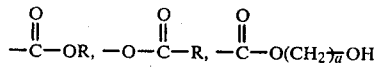

wherein a is an integer having values of 1-3,

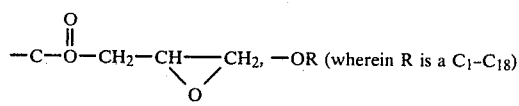

alkyl), —OH, —C—N(R$_1$)$_2$ (wherein R$_1$ is a monovalent radical selected from the group consisting of —H, methyl or ethyl), and —CN;

Y is a monovalent radical selected from the group consisting of —H, methyl,

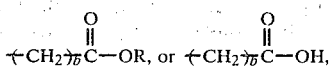

wherein b is an integer having values of 0–4, and

Z is a monovalent radical selected from the group consisting of

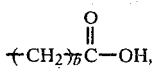

—$SO_3H$ and —$C_6H_4$—$SO_3H$, with the proviso that Y and Z are never —COOH and —$SO_3H$ at the same with, (1) sufficient water-miscible base to neutralize about 10% to 100% of said carboxylic or sulfonic acid groups, (2) 1 to about 500 parts, per 100 parts by weight of vinyl resin, of a water-miscible normally liquid solvent for said vinyl resin having a boiling point below 160° C., selected from the group consisting of lower aliphatic ketones, esters of ethers having 3 to about 6 carbon atoms and cycloaliphatic ketones or ethers having 4 to about 6 carbon atoms;

(3) 1 to about 500 parts, per 100 parts by weight of vinyl resin, of a normally liquid co-solvent which is a poor solvent for the vinyl resin but is miscible with water and solvent (2), selected from the group consisting of:

(1) glycol monoalkyl ethers having the formula: HO—(CHR''CHR'''O)$_r$R'''' where each of R'', R''' is H or $CH_3$, r is an integer having values of 1 to 3 and R'''' is an alkyl group having 1 to about 6 carbon atoms, or phenyl, (2) aliphatic acidic ethers having the formula: R''''O—$(CH_2)_q$COOH wherein R'''' is an alkyl group having 1 to 4 carbon atoms (3) amino esters having the formula:

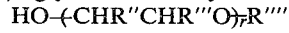

(4) amino ketones having the formula:

(5) aliphatic alcohols having the formula: $R_2OH$, where $R_2$ is alkyl having 1 to 5 carbons, (6) aliphatic carboxylic acids having the formula:

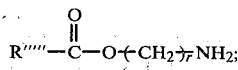

where $R_3$ is H or alkyl having 1 to 4 carbons, (7) aliphatic amines having the formula:

where $R_4$ and $R_5$ are H or alkyl having 1 to 6 carbons and $R_6$ is alkyl having 1 to 6 carbons with the proviso that the total number of carbons is the sum of $R_4+R_5+R_6 \leq 6$, (8) aliphatic amino ethers having the formula $[R_7O(CH_2)_g]_rNH_{3-r}$ where $R_7$ is methyl or ethyl, and g has values of 1–4, (9) aliphatic dialkyl amides having the formula:

$R_8CON(R_7)_2$ where $R_8$ is H or alkyl having 1 to 5 carbons,

(10) N-(Hydroxymethyl)acrylamide and N-(hydroxymethyl)methacrylamide having the formula:

$CH_2$=$CR_9CONHCH_2OH$ where $R_9$ is H or —$CH_3$,

(11) cycloaliphatic ether alcohols having the formula:

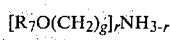

where $R_{10}$ is alkylene having 1 to 3 carbons and v is an integer having values of 1 to 5,

(12) hydroxy esters having the formula:

and

(13) hydroxy ketones having the formula:

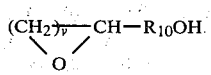

(4) 1 to about 49 parts by weight of a water-immiscible organic diluent per hundred parts by weight of organic solvent (3) selected from the group consisting of alkanes having about 5 to about 20 carbon atoms and halogenated alkanes having about 2 to about 20 carbon atoms, cycloalkanes and halogenated cycloalkanes having about 5 to about 12 carbon atoms, aromatic hydrocarbons having 6 to about 12 carbon atoms, aliphatic or cycloaliphatic ketones having about 7 to about 12 carbon atoms, alkaryl ketones having about 7 to about 12 carbon atoms, aliphatic and aromatic esters having about 7 to about 12 carbon atoms and olefins having about 6 to about 20 carbon atoms;

(5) sufficient water to provide an aqueous colloidal dispersing having a total solids content of up to about 60% by weight; and then (B) stripping the colloidal dispersion until the total content of organic solvents (2) and (3) and diluent (4) is about 0.2 to about 20% by volume; and finally (C) mixing an effective amount of an acrylic internally crosslinked rheology modifier with the colloidal dispersion from (5) until a stable, colloidal dispersion is obtained.

The vinyl resins useful in this invention in their broadest sense are copolymers of vinyl chloride, vinylidene chloride or both copolymerized with a vinyl co-monomer containing at least one carboxylic acid group, —COOH or sulfonic acid group, —$SO_3H$. Exemplary resins include copolymers of vinyl chloride and acrylic or methacylic acid, vinyl chloride and maleic acid, vinyl chloride and styrene sulfonic acid and the like; copolymers of vinylidene chloride and acrylic or methacrylic acid, vinylidene chloride and maleic acid, vinylidene chloride and styrene sulfonic acid, and the like.

These vinyl resins also encompass three component copolymers containing for example the following monomers copolymerized therein:
vinyl chloride/vinyl acetate/acrylic acid
vinyl chloride/vinyl acetate/maleic acid
vinyl chloride/vinyl acetate/crotonic acid
vinyl chloride/vinyl acetate/5-norbornene-2,3-di-carboxylic acid, monobutyl ester
vinyl chloride/vinyl acetate/fumaric acid
vinyl chloride/methyl methacrylate/maleic acid
vinyl chloride/acrylonitrile/maleic acid
vinyl chloride/styrene/maleic acid
vinyl chloride/vinyl stearate/maleic acid
vinyl chloride/2-propenyl acetate/maleic acid
vinyl chloride/hydroxypropylacrylate/maleic acid
vinyl chloride/glycidyl methacrylate/maleic acid
vinyl chloride/acrylamide/maleic acid
vinyl chloride/vinyl alcohol/maleic acid
vinyl chloride/vinyl butyl ether/maleic acid
vinyl chloride/ethyl acrylate/maleic acid
vinyl chloride/ethylene/maleic acid
vinyl chloride/ethylene/acrylic acid
vinyl chloride/propylene/maleic acid
vinyl chloride/styrene/acrylic acid
vinyl chloride/vinyl acetate/styrene sulfonic acid
vinyl chloride/vinyl acetate/vinyl sulfonic acid, and the like as well as other terpolymers in which vinylidene chloride is substituted for vinyl chloride in this list.

In addition four component quadripolymers can also be used wherein both vinyl chloride and vinylidene chloride are copolymerized with the other comonomers shown in the terpolymers in the preceding paragraph.

The amount of each monomer copolymerized in the vinyl resins is not narrowly critical.

The ethylenically unsaturated carboxylic acids enumerated above as well as the other comonomers are commercially available. The more common sulfonic acid containing monomers are also commercially available or can be synthesized by sulfonation of ethylenically unsaturated monomers ranging from aliphatic monomers, such as, ethylene to aromatic monomers, such as styrene, with known sulfonation agents, such as, listed in "Unit Processes in Organic Synthesis" by P. H. Groggins, McGraw-Hill Co., Inc., page 262 NYC (1947).

The invention is not limited to single copolymer vinyl resins and so various combinations of two or more of these vinyl resins can be emulsified as well.

Preferred vinyl chloride resins include vinyl chloride terpolymers having about 60 to about 91 weight percent vinyl chloride, about 10 to about 25 weight percent vinyl acetate and about 1 to about 15 weight percent of maleic acid, fumaric acid or crotonic acid copolymerized therein. Such terpolymers may be obtained commercially or may be synthesized by a free radical initiated polymerization of vinyl chloride, vinyl acetate and maleic acid, or maleic anhydride, fumaric acid or crotonic acid.

Examplary co-solvents are presented below.

Representative glycol monoalkyl (phenyl) ethers are monomethyl, ethyl, propyl, butyl ethers of ethylene glycol, diethylene glycol, triethylene glycol, propylene glycol, dipropylene glycol, phenyl glycol ether and the like.

Representative aliphatic acidic ethers include ethoxyacetic acid, α-methoxy-propionic acid, dimethoxy acetic acid, ethoxy propionic acid and the like.

Representative amino esters include methyl β-aminopropionate, ethyl aminoacetate, ethyl amino-propionate and the like.

Representative amino ketones include amino acetone, 2-aminobutanone and the like.

Representative aliphatic alcohols include methanol, ethanol, propanols, butanols, pentanols and the like.

Representative aliphatic carboxylic acids include formic acetic, propionic, butyric and like acids.

Representative aliphatic amines include methylamine, dimethylamine, methyl-ethylamine, dimethylamine, triethylamine, n-butylamine, hexyamine and the like.

Representative aliphatic amino ethers include α-methoxy-n-propylamine, α-ethoxy-n-propylamine, β-methoxy-isobutylamine, β-ethoxy-n-butylamine and the like.

Representative aliphatic dialkyl amides include N,N-dimethylformamide, N,N-diethylformamide, N,N-dimethyl-acetamide and the like.

Representative cycloaliphatic ether alcohols include glycidol, tetrahydrofurfuryl alcohol and the like.

Representative hydroxy esters include methyl lactate, methyl-β-hydroxypropionate, ethyl-β-hydroxypropionate and the like.

Representative hydroxy ketones include 1-hydroxy-2-propanone, 1-hydroxy-3-butanone, 3-methyl-4-hydroxy-2-butanone, 1-hydroxy-2-pentanone, 4-hydroxy-2-pentanone, and the like.

The order of addition of the components used to prepare these colloidal dispersions is not critical. Thus for example, one may first make a varnish of the vinyl resin with the solvent and co-solvent, and optionally a diluent followed by conversion to an ionomer with base and then emulsification with water. The water can be added to the varnish or vice versa. One may also make these colloidal dispersions from dry vinyl resin rather than a varnish thereof, by adding pulverized resin pellets to a mixture of solvent, co-solvent, base, water and a diluent followed by addition of the rheology modifier.

Alternatively, the resin may be fed in the molten state from a vent extruder or a thin film evaporator into a mixture of solvent, co-solvent, diluent, rheology modifier, base, and water with vigorous stirring.

The degree of neutralization of the acid moieties in the vinyl resin components can as pointed out above vary over a wide range, i.e., from about 10% to about 100%. The optimum degree of neutralization depends upon the amount of acid moiety in the vinyl resin. Thus for example a vinyl resin containing a low amount of acid moiety, e.g., 2 or 3 weight percent should be neutralized with base to a much greater extent than a vinyl resin containing a large amount of acid moieties. This is believed to be due to the higher polarity of the higher acid moiety containing vinyl resins.

No special equipment is needed to effect emulsification other than agitation or mixing equipment known to those skilled in the art.

The term "acrylic internally crosslinked rheology modifier" is used in this invention to mean copolymers of about 40 to about 60 weight percent of hard monomers, such as, methyl methacrylate, styrene and the like, about 10 to about 35 weight percent of soft monomers, such as alkyl or hydroxyalkyl acrylates or methacrylates having 2 to about 8 carbons in the alkyl moiety and about 25 to about 50 weight percent of acidic monomers, such as, acrylic acd, methacrylic acid, itaconic acid, maleic acid, fumaric acid, and the like, plus about 0.1 to about 10 weight percent of a polyfunctional monomer, such as, trimethylol propane triacrylate
trimethylol propane trimethacrylate
neopentyl glycol diacrylate
neopentyl glycol dimethacrylate
pentaerythritol acrylate or methacrylate
divinyl benzene
trivinyl benzene
N-methylolacrylamide
1,3-butylene glycol dimethacrylate
1,4-butylene glycol dimethacrylate
diethylene glycol dimethyacrylate
dipropylene glycol dimethacrylate
ethylene glycol dimethacrylate
propylene glycol dimethacrylate, and the like.

The term "effective amount of acrylic internally crosslinked rheology modifier" is defined herein as about 2 parts to about 50 parts per 100 parts by weight of vinyl resin.

The term "hard monomer" is defined herein as one whose normally solid homopolymers have a Tg (second order glass transition termperature) of at least about 20°–25° C.

The term "soft monomer" is defined herein as one whose normally solid homopolymers have a Tg of less than about 20° C.

The presence of an acrylic internally cross-linked rheology modifier enhances a storage stability as well as ensuing a correct viscosity—total solids relationship during spraying operations. However, where maximum stability of the colloidal dispersion is needed, it has been found that the addition of small amounts, in the order of about 1 to about 5 parts by weight of a low molecular weight per 100 parts of vinyl resin acrylic stabilizer will improve stability.

The term "low molecular weight acrylic stabilizer" as used in this invention is meant to mean copolymers of lower alkyl acrylates or methacrylates having 1 to about 4 carbons having copolymerized therein, at least two of the following monomers: stryene, hydroxyalkyl acrylates or methacrylate wherein the alkyl group contains 2 or 3 carbons and acrylic or methacrylic acids. The molecular weights of the above-described stabilizers in terms of the Brookfield viscosities of their aqueous solutions neutralized with ammonia at 20% total solids lie in the range of about 25 to about 4500 centipoise at 25° C. measured on a Brookfield Viscometer Model RVT. These acrylic stabilizers can be synthesized by emulsion, suspension, bulk or solution polymerization in the presence of a chain transfer agent, such as, an alkyl mercaptan to limit the molecular weight of the resultant copolymer. Concentrations in the range of about 0.1% to about 1% by weight of chain transfer agent are satisfactory. All measurements were made at 50 rpm with spindle choice determined by those giving a deflection of the pointer of at least 15% of scale. Thus for example stabilizers having a Brookfield viscosity of less than about 100 centipoise were measured using a No. 2 spindle. Higher viscosities required appropriately smaller size spindles such as No. 6.

Exemplary acrylic stabiizers preferred in this invention include those shown in Table I.

It is a unique feature of the dispersions described herein that all necessary ingredients for a satisfactory interior can coating may be introduced at the time of emulsification. The finished colloidal dispersion may be used as is, or stripped to higher total solids by vacuum distillation, or thinned down to lower total solids by adding back water. Coating formulations prepared in this manner will exhibit satisfactory flow, atomization, and wetting characteristics which are essential requirements in airless spray applications.

Additionally, due to the extremely fine particle sizes present in these dispersions, very thin continuous protective films can be laid on both metallic and non-metallic substrates. The resultant films are pin hole free, blush resistant and adhere tenaciously to the substrates.

If so desired, the rheology modifier can be partially or completely withheld during the emulsification and introduced after the solvent stripping.

The above-described vinyl chloride resins can also be blended with vinyl chloride/vinyl acetate terpolymers containing glycidyl or hydroxyalkyl acrylates or methacrylates having 2 or 3 carbons in the alkyl group to afford crosslinked coatings. One can also add thermosetting resins, such as, epoxy resins, urea resins and melamine resins to obtain a higher degree of cross-linking. Preferred epoxy resins include liquid and solid diglycidyl ethers of bisphenol A which are commercially available and described in "Epoxy Resins" by H. Lee and K. Neville, McGraw-Hill and Co., Inc. NYC 1957, incorporated herein by reference.

Preferred melamine resins are the hexamethoxymethylmelamine resins. Preferred urea resins are the methylated urea-formaldehyde resins. There are commercially available.

Blush or whitening of the coatings is determined subjecting, a test well known to those skilled in the art.

Wet adhesions measured by cross-hatch adhesive failure determinations. These are made by immersing coated specimens in water at 75° C. for 45 minutes, scratching a cross on the coated substrates with a sharp pointed instrument, pressing sections of Scotch tape across the scratched portions and then ripping the Scotch tape away from the coated surface. Failures are indicated by the amount of coating which pulls away from the substrate.

Other additives known to those skilled in the art can also be incorporated into the colloidal dispersions if desired. These include dyes, pigments, fillers, anionic surfactants, antioxidants, ultraviolet stabilizers, heat stabilizers and the like.

The anionic surfactants used in this invention are not narrowly critical. Useful representatives include sodium or potassium alkyl sulfonates, alkyl sulfates, alkyl ether sulfates, alkylaryl sulfonates, and the like. Particularly preferred are dioctyl esters of sulfosuccinic acid, the dicyclohexyl ester of sodium sulfosuccinic acid, sodium or potassium salts of polycarboxylic acids and the like.

For the purposes of this invention the term "water miscible base" is used in the broad sense of any proton acceptor which will neutralize the acid functionalities in the vinyl resin, i.e., —COOH or $SO_3H$ groups and whose solubility is at least about 1 g. per 1000 cc of water. Exemplary bases which may be organic or inorganic, include alkali metal or alkaline earth hydroxides, such as, sodium hydroxide, potassium hydroxide, lithium hydroxide, magnesium hydroxide, calcium hydroxide, strontium hydroxide, barium hydroxide, and the like; and ammonium hydroxide; organic amines including monoalkylamines, alkenediamines, alkanolamines, aromatic amines, cyclic amines, alkaryl amines, and the like. For economic reasons and ready availability alkali metal, alkaline earth and ammonium hydroxides are preferred inorganic bases. In coating application it is preferred to use volatile bases which are fugitive and consequently reversible ionomers are formed. For example, ammonium hydroxide or lower molecular weight alkylamines form ionomers which afford coatings wherein the ionomer moieties revert to acid and from which the base, being fugitive, is removed. This enhances blush resistance and minimizes color formation upon exposure of the final coating to the elements. Particularly preferred alkylamines include monomethyl amine, dimethyl amine, trimethyl amine, triethyl amine, and the like.

In general, preferred alkyl amines have the formula:

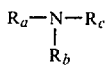

wherein each of $R_a$, $R_b$ and $R_c$ is H or a $C_1$-$C_6$ alkyl with the proviso that $R_a + R_b + R_c \leq 6$ carbons.

Preferred alkylene diamines have the formula

where $x = 1-8$ and D is alkylene radical.

Preferred alkanolamines include mono-, di-, and triethanolamine, N-methyl ethanolamine, N,N-dimethylethanolamine, N,N-diethyl ethanolamine, N aminoethylethanolamine, N-methyl diethanolamine and the like.

Preferred cyclic amines include morpholine, N-methyl morpholine, piperidine, pyrrolidine, piperazine, N-methyl piperazine, N-(2-hydroxyethyl)piperazine, N-aminoethyl piperazine, 2,5-dimethyl piperazine, hexamethylene tetramine, and the like.

Preferred lower aliphatic ketone solvents include acetone, methyl ethyl ketone (MEK), diethyl ketone, methyl n-propyl ketone, methyl isopropyl ketone, acetyl acetone, 1-methoxy-2-propanone, and the like.

Preferred lower aliphatic ester solvents include methyl formate, ethyl formate, methyl acetate, ethyl acetate, isopropyl acetate, and the like.

Preferred lower aliphatic ether solvents include diethyl ether, ethyl propyl ether, di-n-propyl ether and the like.

Preferred cycloaliphatic ketone solvents include cyclobutanone, cyclopentanone, cyclohexanone, and the like.

Preferred cycloaliphatic ether solvents include dioxane, tetrahydrofurane, and the like.

Depending on the particular vinyl halide resin used, it may be preferable to use mixtures of these solvents rather than a single solvent. For example, with a vinyl chloride/vinyl acetate/maleic acid terpolymer the combination of acetone with another ketone such as methyl ethyl ketone, will give dispersions superior to those formulated with acetone alone. It is also permissible to use a mixture of co-solvent instead of a single co-solvent.

Exemplary water-immiscible organic diluents which are miscible with both the solvents and co-solvents include:

alkanes having about 5 to about 20 carbon atoms and halogenated alkanes having about 2 to about 20 carbon atoms, such as, pentane, hexane, heptane, 1-chloropentane, 1,2-dichloroethane, trichloroethylene, tetrachloroethylene, 1,2-dibromohexane, and the like;

cycloalkanes and halogenated cycloalkanes having about 5 to about 12 carbon atoms, such as, cyclopentane, cyclohexane, cycloheptane, chlorocyclohexane, and the like;

aromatic hydrocarbons having 6 to about 12 carbon atoms, including both unsubstituted and alkyl or halogen substituted hydrocarbons, such as, benzene, toluene, zylenes, chlorobenzene, o-chlorotoluene, and the like;

aliphatic ketones having about 7 to about 12 carbon atoms, such as, propylbutyl ketone, dibutyl ketone, butylhexyl ketone, and the like;

cycloaliphatic ketones having about 7 to about 12 carbon atoms, such as, cyclohexyl ketone, cycloheptyl ketone, and the like;

alkaryl ketones having about 7 to about 12 carbon atoms, such as, acetophenone, propionphenone, and the like;

aliphatic and aromatic esters having about 7 to about 12 carbon atoms, such as, methyl benzoate, hexyl benzoate, methyl hexanoate, propyl octanoate, hexyl acetate, and the like;

olefins having about 6 to about 20 carbon atoms, such as, hexene-1, octene-2, octene-1, eicosene-1, and the like.

While these water-immiscible diluents can be used at a level of up to about 49 parts per hundred parts by weight of organic solvent, it is preferred however to use a level of about 1 to about 40 parts and even more preferred to use a level of about 1 to about 25 parts per hundred parts by weight of organic solvent.

While it is not absolutely essential, if desired, an organic coalescing aid may be added to the stripped colloidal dispersion.

Exemplary coalescing aids include: glycol ethers such as ethylene and propylene oxide adducts of alcohols such as methyl ethyl propyl butyl pentyl hexyl, and like alcohols.

When used the coalescing aids should be present in an amount up to about 25 parts by weight per 100 parts by weight of water in the colloidal dispersion.

The colloidal dispersions of this invention are particularly adapted to coating cans although other substrates both metallic and non-metallic can also be coated with these dispersions for their improved utility in packaging and myriad other applications which will become apparent to those skilled in the art upon a reading of the specification.

Cupric sulfate test is a test commonly used for detecting the presence of pin holes in an interior can coating. Satisfactory coatings should reveal no visible defects in this test.

Interior can coatings are usually applied by airless spray, a technique well known to those skilled in the art. While most examples described in this invention are based on 2-piece aluminum cans, this invention is equally useful to 2-piece cans constructed of other metals as well as to 3-piece cans. These metallic cans are used widely for the packaging of beer, beverage and food.

The dispersions prepared according to the practice of this invention are characterized by having a solids content of about 25 to about 30% by weight and low viscosities of for example about 10 centipoise to about 20 centipoise.

The invention is further described in the examples which follow. All parts and percentages are by weight unless otherwise specified. A laboratory airless can spray unit consisting of an emulsion reservoir, a pumping unit, a pressure gauge, a timer, a heating device, a nozzle assembly, and a rotary can mount was employed.

CONTROL X

To a varnish composed of:

| | |
|---|---|
| Bakelite VMCC vinyl resin[a] | 66.0 g |
| acetone | 152.1 g |
| toluene | 28.7 g |
| isobutanol | 53.2 g |

[a](Trademark of Union Carbide Corporation for a terpolymer containing 81% vinyl chloride, 17% vinyl acetate and 1% maleic acid copolymerized therein.)

was added with vigorous stirring a water-ammonia solution having the composition:

| | |
|---|---|
| water | 300.0 g |
| conc NH$_4$OH (28%) | 8.0 g |

A fine particle dispersion resulted which was then distilled under vacuum to remove essentially all of the acetone, toluene and isobutanol and some of the water affording the following composition:

| | Composition, Wt. % |
|---|---|
| VMCC resin | 25.0% |
| water | 74.0% |
| acetone | ≦1.0% |
| toluene | ≦1.0% |
| isobutanol | ≦1.0% |

The above dispersion of water-borne solvent vinyl resin was tested for stability at 40° C. After 3 days at 40° C., the system had set to a non-fluid gel-like consistency. Replicate runs showed erratic stabilities of 3 to 9 days.

EXAMPLE 1-3

Control X was repeated with the exception that 1.4 g., 2.8 g. and 7.0 g. of an acrylic latex, Polymer A, at 46% total solids to yield a level of 1, 2, and 5 parts of acrylic solids per 100 parts of vinyl resin solids, was added to the varnish and mixed prior to addition of the water/ammonia solution described in Control X.

When tested for stability at 40° C., the system did not set to a non-fluid gel-like consistency until 6, 23, and 47 days respectively had elapsed.

EXAMPLES 4-6

Control X was repeated with the exception that 2.6, 5.2 and 13 g. of an acrylic latex (Polymer B) at 25% total solids to yield a level of 1, 2, and 5 parts of acrylic solids per 100 parts of vinyl resin solids was added to the varnish and mixed prior to the water ammonia solution described in Control X. When tested for stability at 40° C., the system did not set to a non-fluid gel-like consistency until 6, 42 and 21 days respectively had elapsed.

EXAMPLES 7-9

Control X was repeated with the exception that 2.4, 4.8 and 12 g. of an acrylic latex (Polymer C) at 27.5% total solids to yield a level of 1, 2 and 5 parts of acrylic solids per 100 parts of vinyl resin solids was added to the varnish and mixed prior to the addition of the water-ammonia solution described in Control X. When tested for stability at 40° C. the system did not set to a non-fluid, gel-like consistency until 4, 3–6 and 11–15 days respectively had elapsed.

EXAMPLES 10-12

Control X was repeated with the exception that 2.5, 5.0 and 12.5 g. of acrylic latex (Polymer D) at 26% total solids to yield a level of 1, 2 and 5 parts of acrylic solids per 100 parts of vinyl resin solids was added to the varnish and mixed prior to the addition of the ammonia-water solution described in Control X. When tested for stability at 40° C. the system did not set to a non-fluid, gel-like consistency until 4, 92 and 15 days respectively had elapsed.

These Examples demonstrated the enhancement in stability of the vinyl resin water-borne colloidal dispersions of this invention by the incorporation of a low viscosity stabilizer therein.

EXAMPLE 13

Control X was repeated with the exception that 0.33 g. of a surfactant Aerosol A-196 (dicyclohexyl sulfo succinate, sodium salt) to yield a level of 0.5% based on the weight of vinyl resin solids, was added to the varnish and mixed prior to the addition of the water/ammonia solution described in Control X.

When tested for stability at 40° C., the system did not set to a non-fluid gel-like consistency until 153 days had elapsed.

EXAMPLE 14

Control X was repeated with the exception that 1.3 g. of a surfactant TAMOL 731 at 25% total solids to yield a level of 0.5% based on the weight of vinyl resin solids was added to the varnish prior to the addition of the water/ammonia solution described in Control X.

When tested for stability at 40° C., the system did not set to a non-fluid gel-like consistency until 37 days had elapsed.

EXAMPLE 15

Control X was repeated with the exception that 0.9 g. of a surfactant Disperse-Ayd W22 at 35% total solids to yield a level of 0.5% based on the weight of vinyl resin solids, was added to the varnish prior to addition of the water/ammonia solution described in Control X.

When tested for stability at 40° C., the system did not set to a non-fluid gel-like consistency until 24 days had elapsed.

Examples 13 to 15 demonstrate the enhancement in stability of the vinyl resin water-borne colloidal dispersions of this invention by the incorporation of surfactants.

The water-borne vinyl dispersions of Control X and Examples 1 to 15 are too low in viscosity to be useful as coatings. These dispersions must be modified with rheology modifiers to provide a viscosity that is suitable for the various methods of coating application and also to provide proper flow control of the coating during drying operations to keep the coating in place without excessive sagging or run-off.

For spray applied coatings, a low viscosity of the order of 50-200 centipoise is required for good atomization of the coating. Furthermore, the liquid coating must stay in place until cured once it is applied with no running or sagging even if heat should be used to accelerate drying.

In the practice of this invention the waterborne vinyl dispersions were modified with the acrylic polymers delineated in Tables 1 and 2 to serve as rheology modifiers and also with a diluent to aid film formation.

The resultant coatings (Examples 16-26) were tested as linings for beverage cans in the following manner: coatings were applied by hydraulic atomized (airless) spray equipment. The can bodies (12 fluid ounce size) were sprayed while the can itself was mounted in a horizontal position in a holder that was rotated at a velocity of 2000 rpm. The spray tip was positioned about two inches from the mouth of the can. The spray duration was on the order of 100-150 milli-seconds. Thus each can made 3-4 revolutions during the duration of the spray.

After the coating was applied to provide an average film weight of 3-5 mg of dried coating per square inch of can surface each can was dried by baking in an oven at 196° C. for two minutes. The coated cans were then tested for continuity of surface coverage using an electrical device which is essentially an ammeter that measures current flow through pin holes or breaks in the film coating of each coated can. In this test, a coated can was filled with an electolyte sodium chloride solution, and an electrode was immersed in the electrolyte. The can body itself completed the circuit. Thus if a pin-hole free coating is obtained, no current will flow when a potential is applied. Conversely, the amount of current flow is directly proportional to uncoated surfaces inside the can.

Aside from the necessity of having a continuous coating on each can, it is desirable to have the coating as evenly distributed as possible over the can surface. The presence of sags and runs is particularly objectionable because such a condition means some areas are excessively thin, others are so thick as to perhaps cause blistering or pin holing during baking. These conditions can lead to premature lining failure.

In commercial can coating operations each can receives a definite weight of coating formulation. This makes it necessary that an even distribution is obtained because there is no excess to cover up thin areas produced.

Thus in order for a coating to fulfill these requirements means that the coating must have a viscosity amenable to good atomization so that the liquid film can be deposited as evenly as possible on the can surface. The liquid film must also stay in place during drying, so that when tested for continuity of coverage, current flow values less than 10 milliamps are obtained.

Table 3 lists viscosity data and comments on the degree of atomization and current flow values for the coatings of Examples 16-26.

The viscosity data of coatings formulated with the acrylic polymers described in Tables 1 and 2 show as a general trend that coating viscosity is dependent on polymer solution viscosity as indicated by a Brookfield Viscometer which is in turn dependent on polymer molecular weight.

The polymers that display a low viscosity in ammoniated water solution, less than 100 cps at 15-20%, Ts do not provide thickening action even when used at rather high levels up to in the range of 5.5 to 8.7% polymer in the volatile phase. Coating formula viscosity is less than 100 cps in the case of polymers A, B, C, D, E, G and hydraulic atomization is very good, but because of the absence of thickening effect, the wet films of coatings in Examples 16-20 quickly run off vertical surfaces.

As the coating viscosity increases as in the case of Polymers F and I, Examples 21 and 24, the degree or quality of hydraulic atomization decreases. Very good hydraulic atomization means a spray of very fine droplets evenly distributed over the width of the spray fan that appears as a mist. Fair to poor quality atomization means that the appearance of the spray fan in uneven with areas of heavier concentration, with finger-like projections, emanating from the spray tip. Resultant sprayed surfaces form poorly atomized spray coatings yield alternate heavy or thick sections from the finger-like projections and thin sections from the areas between the finger-like projections.

Coatings formulation Examples 21 and 24 show that high coating viscosity is still prone to running and sagging and coupled with a somewhat uneven applied coating film due to a lesser degree of atomization quality leads to a sufficient number of pin holes or have spots so as to yield a poor performance in the electrical continuity test.

Coating formulation Examples 25 and 26 show clearly unexpected results. The thickener polymers J and K yield high coating viscosity, at low levels of thickener. Yet excellent hydraulic atomization was observed with excellent uniformity of the applied coating. Electrical conductivity tests show essentially complete coverage. Heretofore, good atomization with good film distribution and electrical continuity would not be expected from a coating that had viscosity in excess of 200 cp.

The low molecular weight stabilizers used in this invention are delineated in Table 1 as Polymers A, B, C, and C.

Intermediate and high molecular weight polymers evaluated as rheology modifiers are delineated in Table 2 as Polymers E, F, G, H, I, J, and K. Only polymers J and K are internally crosslinked, the former by including trimethylol propane triacrylate and the latter a commercially available internally cross-linked polymer sold by Rohm & Haas. This is believed to be a copolymer of methyl methacrylate, ethyl acrylate and methacrylic acid copolymerized with a minor amount of a polyfunctional acrylate, such as, trimethylol propane triacrylate.

TABLE 1

LOW MOLECULAR WEIGHT STABILIZER POLYMERS

| | Composition | | | | | | | Brookfield |
|---|---|---|---|---|---|---|---|---|
| | MMA[1] | STY[2] | EA[3] | HEA[4] | MMA[5] | CTA[6] | T | Viscosity, cp |
| Polymer A | 45 | — | 30 | — | 25 | 1% | 20% | 84 |

TABLE 1-continued
LOW MOLECULAR WEIGHT STABILIZER POLYMERS
Composition

|  | MMA[1] | STY[2] | EA[3] | HEA[4] | MMA[5] | CTA[6] | T | Brookfield Viscosity, cp |
|---|---|---|---|---|---|---|---|---|
| Polymer B | — | 30 | 45 | 12.5 | 12.5 | 1% | 20% | 44 |
| Polymer C | 5 | 40 | 45 | — | 10 | 0.25% | 20% | 24 |
| Polymer D | 25 | 25 | 40 | — | 10 | 0.25% | 20% | 56 |

[1] methyl methacrylate
[2] styrene
[3] ethyl acrylate
[4] hydroxy ethyl acrylate
[5] methacrylic acid
[6] chain transfer agent, butyl mercaptan

TABLE 2
INTERMEDIATE AND HIGH MOLECULAR WEIGHT POLYMERS
Composition

|  | MMA[1] | STY[2] | EA[3] | HEA[4] | MMA[5] | CTA[6] | TMPTA[7] | T | Brookfield Viscosity, cp |
|---|---|---|---|---|---|---|---|---|---|
| Polymer E | 25 | 25 | 40 | — | 10 | None | — | 15% | 68 |
| Polymer F | — | 45 | 30 | 12.5 | 12.5 | None | — | 15% | 28 |
| Polymer G | 45 | — | 30 | — | 25 | ¼% | — | 20% | 1,920 |
| Polymer H | 20 | 20 | 40 | — | 20 | ⅛% | — | 20% | 4,530 |
| Polymer I | 45 | — | 30 | — | 25 | None | — | 10% | 7,950 |
| Polymer J | 45 | — | 30 | — | 25 | None | 0.50% | 10% | 21,600 |
| Polymer K | Acrysol | ASE-60 |  |  |  |  |  | 2% | 10,000 |

[1] methyl methacrylate
[2] styrene
[3] ethyl acrylate
[4] hydroxy ethyl acrylate
[5] methacrylic acid
[6] chain transfer agent, butyl mercaptan
[7] trimethylol propane triacrylate

TABLE 3

|  | 16 | 17 | 18 | 19 | 20 | 21 | 22 | 23 | 24 | 25 | 26 |
|---|---|---|---|---|---|---|---|---|---|---|---|
| Water-borne vinyl resin dispersion, Control X @ 25% T | 100 | 100 | 100 | 100 | 100 | 100 | 100 | 100 | 100 | 100 | 100 |
| Polymer A @ 44.7% T | 33.6 | — | — | — | — | — | — | — | — | — | — |
| Polymer B @ 25.5% T | — | 39.2 | — | — | — | — | — | — | — | — | — |
| Polymer C @ 27.5% T | — | — | 27.2 | — | — | — | — | — | — | — | — |
| Polymer D @ 26.4% T | — | — | — | 28.4 | — | — | — | — | — | — | — |
| Polymer E @ 25.3% T | — | — | — | — | 29.6 | — | — | — | — | — | — |
| Polymer F @ 26.2% T | — | — | — | — | — | 33.4 | — | — | — | — | — |
| Polymer G @ 45.6% T | — | — | — | — | — | — | 13.7 | — | — | — | — |
| Polymer H @ 43.5% T | — | — | — | — | — | — | — | 14.4 | — | — | — |
| Polymer I @ 46.3% T | — | — | — | — | — | — | — | — | 4.3 | — | — |
| Polymer J @ 45.3% T | — | — | — | — | — | — | — | — | — | 13.8 | — |
| Polymer K @ 28% T (Acrysol ASE-60) | — | — | — | — | — | — | — | — | — | — | 5.3 |
| Butyl Cellosolve | 34.4 | 29.6 | 27.2 | 27.2 | 19.5 | 27.0 | 29.6 | 29.6 | 19.7 | 26.3 | 23.9 |
| Cymel 303 | 3.0 | 2.0 | 1.5 | 1.5 | 1.5 | 1.8 | 1.4 | 1.5 | 0.5 | 1.2 | 0.3 |
| H₂O | 40.5 | 11.2 | 11.6 | 10.4 | 13.4 | 8.4 | 31.2 | 32.2 | 24.6 | 53.1 | 15.8 |
| NH₄OH | 3.5 | 3.0 | 2.5 | 2.5 | 3.0 | 3.0 | 4.7 | 3.3 | 1.4 | 2.1 | 0.8 |
| Coating Constants | | | | | | | | | | | |
| Non Volatile | 20 | 20 | 20 | 20 | 20 | 20 | 18 | 18 | 18 | 16 | 18 |
| phr of thickener | 60 | 40 | 30 | 30 | 30 | 35 | 25 | 25 | 8 | 25 | 6 |
| % Thickener in volatile phase | 8.7% | 6.7% | 5.5% | 5.5% | 5.6% | 6.5% | 4.2% | 4.2% | 1.6% | 3.8% | 1.3% |
| % Co-solvent | 20.0% | 20.0% | 20.0% | 20.0% | 15.0% | 20.0% | 20.0% | 20.0% | 16.0% | 20.0% | 20.0% |
| Viscosity, cp. | 28 | 40 | 24 | 56 | 32 | 172 | 54 | 56 | 144 | 696 | 920 |
| Performance | | | | | | | | | | | |
| Atomization | Very Good | → | → | → | → | Fair | Very Good | Very Good | Fair | Exc | Exc |
| Film distribution | Very poor, sprayed material runs to bottom of can → | | | | | Uneven, sags & → → → runs to bottom | | | | Even film → distribution | |
| Electrical continuity | Very poor- trips circuit breaker → | | | | | Trips circuit breaker too high → → → → | | | | >10 → Milliamp | |

I claim:

1. Method of preparing water-borne colloidal dispersions of vinyl resins selected from the group consisting of vinyl chloride, vinylidene chloride or vinyl chloride/vinylidene chloride copolymers having carboxylic or sulfonic acid groups contained therein which comprises:

(A) blending said resins with:
 (a) water;
 (b) water-miscible base;
 (c) at least one water-miscible organic solvent which is a good solvent for said resins and boils below about 160° C.;

(d) an organic and water-miscible cosolvent which is a poor solvent for said resins but is miscible with the organic solvent (c); and (e) about 1 to about 49 parts by weight of a water-immiscible organic diluent per hundred parts by weight of organic solvent (c) until a colloidal dispersion forms;

(B) stripping off the colloidal dispersion until the total content of organic solvents (c) and (d) and diluent (e) of the colloidal dispersion is about 0.2 to about 20% by volume; and then (C) mixing an effective amount of an acrylic internally crosslinked rheology modifier with the colloidal dispersion from (B) until a stable, colloidal dispersion is obtained.

2. Method claimed in claim 1 wherein the vinyl resins are blended in step (A) with a stabilizing amount of a low molecular weight acrylic stabilizer copolymer of lower alkyl acrylates or methacrylates having 1 to about 4 carbons having copolymerized therein at least two monomers selected from the class consisting of styrene, hydroxyalkyl acrylates or methacrylates wherein the alkyl group contains 2 or 3 carbons, and acrylic or methacrylic acid.

3. Method of claim 2 wherein an anionic surfactant is incorporated into the components of step (A).

* * * * *